(12) United States Patent
Spanke et al.

(10) Patent No.: US 7,046,189 B2
(45) Date of Patent: May 16, 2006

(54) FILL LEVEL MEASURING DEVICE AND METHOD FOR FILL LEVEL MEASUREMENT USING THE TRAVEL TIME PRINCIPLE

(75) Inventors: Dietmar Spanke, Steinen (DE); Marc Baret, Kembs (FR); Edgar Schmitt, Friesenheim (DE); Yong Jin, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/740,923

(22) Filed: Dec. 22, 2003

(65) Prior Publication Data

US 2005/0052314 A1    Mar. 10, 2005

(30) Foreign Application Priority Data

Dec. 20, 2002  (DE) ............................... 102 60 962

(51) Int. Cl.
  *G01F 23/284*  (2006.01)
  *G01S 13/08*  (2006.01)
  *G01S 7/40*  (2006.01)

(52) U.S. Cl. .................. 342/124; 342/118; 342/165; 342/173; 342/174; 342/175; 342/195; 73/290 R

(58) Field of Classification Search .................. 342/22, 342/59, 82–103, 118, 124–145, 175, 188–197, 342/165–174; 73/290 R, 290 B, 290 V, 73/304 R, 304 C, 305–322, 322.5; 324/637–646
See application file for complete search history.

(56) References Cited

U.S. PATENT DOCUMENTS

| 4,234,882 | A | * | 11/1980 | Thompson .................. 342/124 |
| 4,972,386 | A |   | 11/1990 | Lau |
| 5,168,469 | A |   | 12/1992 | Liberto et al. |
| 5,323,361 | A |   | 6/1994 | Elle et al. |
| 6,198,424 | B1 | * | 3/2001 | Diede et al. ................. 342/124 |
| 6,734,819 | B1 | * | 5/2004 | Spanke ....................... 342/124 |
| 2002/0129649 | A1 | | 9/2002 | Kim et al. |

FOREIGN PATENT DOCUMENTS

| DE | 33 37 690 A1 | 4/1985 |
| DE | 42 23 346 A1 | 1/1994 |
| DE | 42 29 079 A1 | 3/1994 |
| DE | 4234300 | 4/1994 |
| DE | 195 44071 A1 | 5/1997 |
| DE | 10061531 | 6/2002 |
| EP | 0 644 404 A1 | 3/1995 |

* cited by examiner

*Primary Examiner*—Bernarr E. Gregory
(74) *Attorney, Agent, or Firm*—Bacon & Thomas

(57) ABSTRACT

A fill level measuring device for measuring a fill level of a fill substance in a container and a method for fill level measurement using this fill level measuring device are provided. The fill level measuring device can perform fill level measurements upon re-start immediately on its own and reliably, and includes: at least one antenna, which issues transmitted signals (S) and receives echo signals (E); a signal processor, which serves for deriving from the received echo signals (E) an echo function containing the amplitudes (A) of the echo signals (E) as a function of travel time; a memory for storing data in a table whose columns serve for storing the echo functions in the columns in a sequence which corresponds to the fill levels associated with the individual echo functions; and an evaluation unit, which accesses the table for determining the fill level.

14 Claims, 4 Drawing Sheets

|   | $t_0$ | $t_1$ | $t_2$ | $t_3$ | $t_4$ | $t_5$ |
|---|---|---|---|---|---|---|
| L | 1 | 2 | 3 | 4 | 5 | m-5 |
| S | 5 | 4 | 3 | 3 | 3 | 3 |
| B | m | m-1 | m-2 | m-3 | m-4 | m-5 |

FILL LEVEL MEASURING DEVICE AND METHOD FOR FILL LEVEL MEASUREMENT USING THE TRAVEL TIME PRINCIPLE

FIELD OF THE INVENTION

The invention relates to a fill level measuring device and to a method for fill level measurement using the principle of travel time in fill level measuring devices which work without contact.

BACKGROUND OF THE INVENTION

Such contactless measuring devices are applied in many branches of industry, e.g. in manufacturing, in the chemical industry and in the foods industry.

In performing fill level measurements, short transmitted signals, e.g. of microwaves or ultrasonic waves, are periodically issued from an antenna onto the surface of a fill substance and their echo signals reflected on the surface are subsequently received, following a distance-dependent travel time. An echo function representing the echo amplitudes as a function of travel time is formed. Each value of this echo function corresponds to the amplitude of an echo reflected at a certain distance from the antenna.

From this echo function, a useful echo is determined, which probably corresponds to the reflection of a transmitted signal from the surface of the fill substance. In this connection, it is usually assumed that the useful echo is the one with the largest amplitude. From the travel time of the useful echo, in the case of a fixed propagation velocity of the transmitted pulse, the distance between the surface of the fill substance and the antenna is immediately obtained.

Usually, a raw, received signal is not used for evaluation, but rather its so-called "envelope curve". The envelope curve is produced by rectifying and filtering the raw signal. For exact determination of a travel time of the useful echo, first a maximum of the envelope curve is determined.

This conventional way of proceeding functions in many applications without problem.

Problems occur, however, always when the echo coming from the fill level cannot be clearly identified. This can be the case, for instance, when installed objects are present in the container and they reflect the transmitted signal better than the surface of the fill substance.

In such cases, the actual fill level can be input into the fill level measuring device, e.g. at start-up. The fill level measuring device can then use the entered fill level to identify the associated echo as the useful echo and e.g. proceed further on the basis of a suitable algorithm. For instance, maxima of the echo signal, or the echo function, are determined in each measuring cycle, and the useful echo is determined on the basis of knowledge of the fill level determined in the previous measuring cycle and an application-specific maximum expected rate of change of the fill level. The signal travel time of the thus-determined, current useful echo is then used to ascertain the new fill level.

Such echo tracing has the disadvantage that the useful echo must be kept track of without interruption. If the fill level measuring device is taken out of service, e.g. for purposes of maintenance, then the useful echo, as a rule, gets lost. The fill level measuring device is then not able to recognize the useful echo reliably. It becomes necessary to start over by repeating the initial input of the current fill level. This can, however, entail, in certain cases, considerable expense. When, for instance, there are no alternative measuring methods available, it can be necessary to empty the container completely, or to fill it completely or to a reference mark. Industrially, this frequently means a shutdown of the manufacturing process and can be associated with considerable loss of time plus high costs.

SUMMARY OF THE INVENTION

It is an object of the invention to provide a fill level measuring device, working on the travel time principle, that, when brought back into operation, can perform fill level measurements immediately, on its own and reliably.

The invention achieves this object by a fill level measuring device for measuring a fill level of a fill substance in a container, which device includes
 at least one antenna for issuing transmitted signals and for receiving echo signals,
 a signal processor, which serves for deriving from the received echo signals echo functions, which contain echo signal amplitude as a function of travel time,
 a memory for storing container-specific data in a table, whose columns each serve for recording an echo function,
  wherein the echo functions are stored in the columns in a sequence corresponding to the fill levels of the respective echo functions, and
 an evaluation unit,
  which has access to the table for determining the fill level.

In a development thereof, the data are stored in the memory in compressed form.

Additionally, the invention resides in a method for the storing of container-specific data in the table of a fill level measuring device of the invention, wherein
 an echo reflected from a fill substance surface is identified as a fill level echo on the basis of a previously input fill level,
 this echo is followed over a period of time,
 during this period of time, transmitted signals are issued, their echo signals are sensed, and, from the echo signals, echo functions are formed,
  each of which is stored in the table in a column having a columns index corresponding to a fill level determined at its point in time by the following of the fill level echo.

Additionally, the invention resides in a method for the storing of container-specific data in the table of a fill level measuring device of the invention, wherein
 a transmitted signal is issued, its echo signal is sensed, and an echo function is derived from the echo signal,
 a useful echo is designated as probably coming from a reflection at the fill substance surface,
 this useful echo is followed over a period of time,
 during this period of time, transmitted signals are issued, whose echo signals are sensed, and, from the echo signals, echo functions are determined,
  each of which is stored in the table in a column under a columns index corresponding to a fill level determined at its point in time by the following of the fill level echo.

In a further development of the last-described method, a plausibility review of the table is performed, the result of which either confirms, or refutes, the useful echo to be an echo reflected from the surface of the fill substance.

In a further development of the last-described further development, the instantaneous fill level is found by means of the table, in the case where the plausibility review yields that the useful echo does not come from a reflection at the surface of the fill substance, and the entire method is repeated, wherein, as useful echo, that echo is chosen, which corresponds to the instantaneous fill level determined by means of the table.

In a further development of the last-described method, the plausibility review includes recognizing in the table contour lines, which correspond to a change of a travel time of the this echo as a function of the fill level. It is checked whether a contour line section is present, in which the travel times fall with increasing fill level and in which the travel times are less in one column than the travel time of the useful echo in the same column. If such a contour line section is present, then it is refuted that the useful echo is an echo reflected from the fill substance surface; if such a contour line section is not present, then the useful echo is accepted as an echo reflected from the fill substance surface.

In a further development of the invention,
the instantaneous fill level is found by means of the table, when the plausibility review shows that the useful echo does not come from a reflection at the fill substance surface, and
the entire method is repeated,
wherein, for the useful echo, that echo is chosen, which corresponds to the instantaneous fill level determined by means of the table.

Additionally, the invention resides in further method for the storing of container-specific data in the table of a fill level measuring device of the invention, wherein
a transmitted signal is issued,
whose echo signal is sensed,
from the echo signal, a plurality of echoes are chosen,
one of these echoes is designated as probably coming from a reflection at the fill substance surface,
during the time period, transmitted signals are periodically issued, whose echo signals are sensed, and
for each echo signal, the travel times of the chosen echoes are determined, and
for each echo signal, the probable fill level to be associated with the useful echo is determined,
the column corresponding to this probable fill level is determined, and
a value is stored in this column for each of the chosen echoes in rows corresponding to the travel times of the individual echoes.

The invention also resides in a method for the storing of container-specific data in the table of a fill level measuring device of the invention, wherein
a transmitted signal is issued, whose echo signal is sensed,
from the echo signal, a plurality of echoes are chosen,
one of these echoes is designated as a useful echo probably coming from a reflection at the fill substance surface,
during the period of time, transmitted signals are periodically issued and their echo signals sensed, and
for each echo signal, the travel times of the chosen echoes are determined, and
for each echo signal, the probable fill level to be associated with the useful echo is determined,
the column corresponding to this probable fill level is determined, and
in this column, values are stored for each of the chosen echoes in rows corresponding to the individual echoes.

In a further development of the last-mentioned method, a plausibility review of the table is conducted, the result of which either confirms or refutes the useful echo as an echo reflected from the fill substance surface.

In a further development of the aforementioned method for the storing of container-specific data in the table of a fill level measuring device of the invention, data missing in the table are determined by extrapolation and stored in the table.

Additionally, the invention resides in a method for fill level measurement with a fill level measuring device of the invention, wherein
a transmitted signal is issued,
whose echo signal is sensed,
from the echo signal, a current echo function is derived, and
for determining the fill level, a comparison of the echo function with the echo functions stored in the table is performed.

In a further development of the last-mentioned method, the fill level measurement is performed by ascertaining in the comparison an echo function in the table having the greatest agreement with the current echo function, and the fill level is set equal to the fill level associated with the column index of the echo function in the table.

The invention and additional advantages will now be explained in greater detail on the basis of the figures of the drawing illustrating an example of an embodiment; equal elements are provided in the figures with equal reference characters.

DESCRIPTION OF THE PREFERRED EMBODIMENTS

Figure 1:
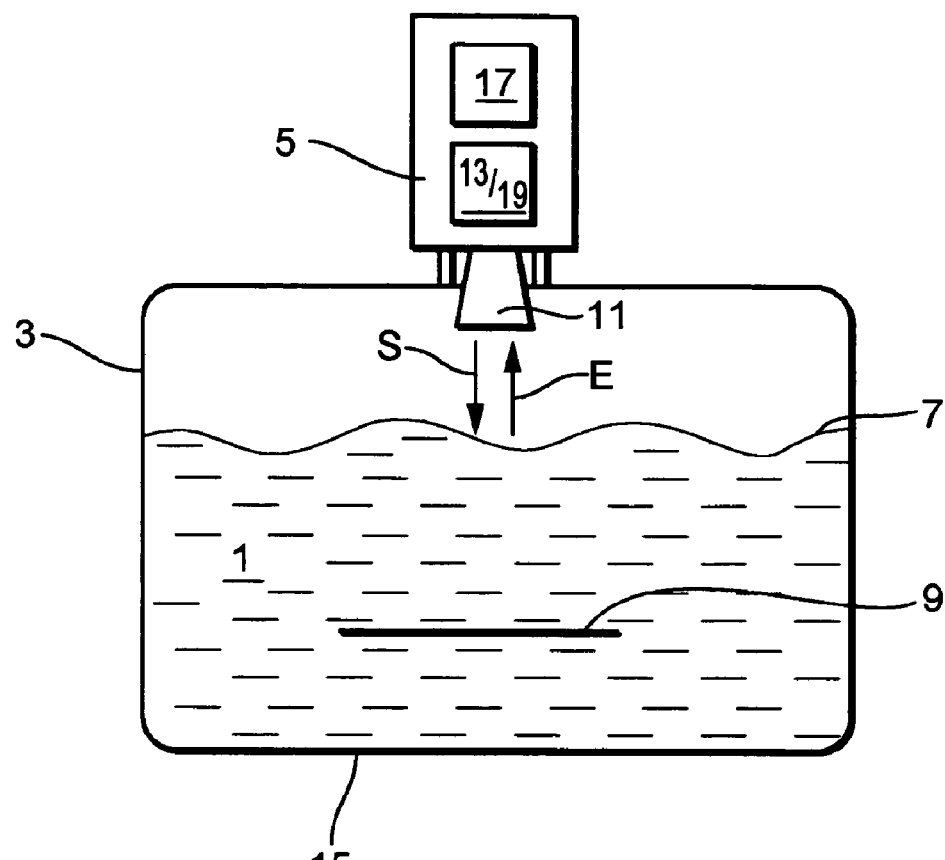
FIG. 1 shows an arrangement for fill level measurement using a fill level measuring device working on the travel time principle.

FIG. 1 shows an arrangement for measuring fill level. Fill substance 1 is present in container 3. Arranged on the container 3 is a fill level measuring device 5 working on the travel time principle. Suitable for the fill level measuring device 5 is e.e. a fill level measuring device working with microwaves, or a fill level measuring device using ultrasound. The fill level measuring device 5 serves for measuring a fill level 7 of the fill substance 1 in the container. A disturbance 9 is drawn in the container 3 by way of example. Disturbances 9 are e.g. installed objects in the container 3, stirrers and, in general, any other structure that can cause reflections. Only a single disturbance 9 is provided here, for ease of understanding. Naturally, in real measuring situations, very many more disturbances can be present.

The fill level measuring device 5 has at least one antenna 11 for issuing transmitted signals S and for receiving echo signals E. In the illustrated embodiment, only a single antenna 11 is provided, which both transmits and receives. Alternatively, however, there can be an antenna for transmitting and at least one more antenna for receiving.

The transmitted signals S are issued in the direction of the fill substance 1 and are reflected from a fill substance surface, as well as from the container 3 itself and from disturbances 9 located in the container 3. The echo signal is a superposition of these reflections.

In fill level measurement using the travel time principle, transmitted signals S, e.g. short microwave- or ultrasonic-pulses, are issued in the direction of a fill substance 1. Their echo signals E are sensed and fed to a signal processor 13 which serves to derive from the received echo signals E echo functions containing the amplitude A of each echo signal as a function of travel time t.

Figure 2:
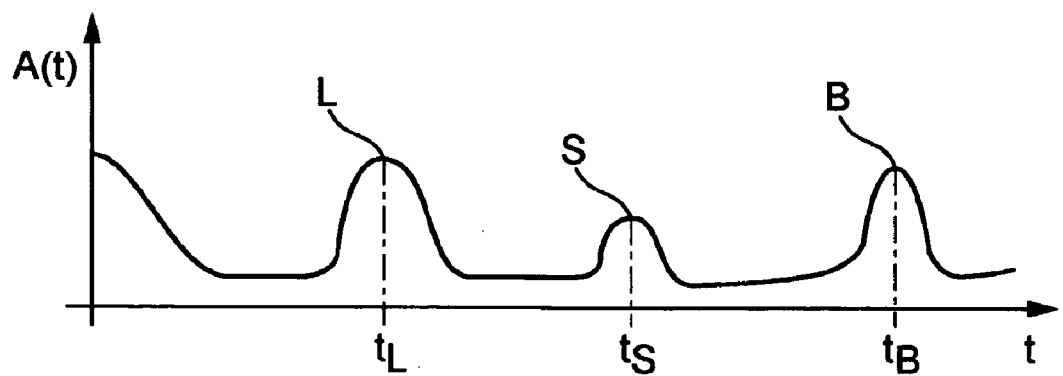
FIG. 2 shows an echo signal E.

FIG. 2 presents an example of one such echo function for the arrangement of FIG. 1. The echo function has three pronounced maxima. These maxima are the echoes L, S, B, of which the echo L comes from a reflection at the fill substance surface, the echo S from a reflection at the disturbance 9, and the echo B from a reflection at the floor 15 of the container. The echoes L, S, B occur after travel times $t_L$, $t_S$, $t_B$ which relate, respectively, to the distances from the antenna to the fill substance surface, the disturbance 9, and the floor 15.

The fill level measuring device 5 has a memory 17, which serves for storing container-specific data.

These container-specific data are recorded when the arrangement is first operated. They are stored permanently. They are not erased when the fill level measuring device 5 is turned off, or experiences a power interruption.

The container-specific data are stored in a table, whose columns 1 to n each serve to record an echo function. In this connection, the echo functions are stored in the columns in a sequence that corresponds to the fill levels associated with the individual echo functions. Equivalent to those associated fill levels are, of course, the matching travel times $t_L$ of the echoes L reflected at the fill substance surface and, equally, the corresponding distances between antenna 11 and fill substance surface. These quantities are directly proportional to one another and can be converted into one another by simple calculation using the known signal propagation velocity.

Figure 3:
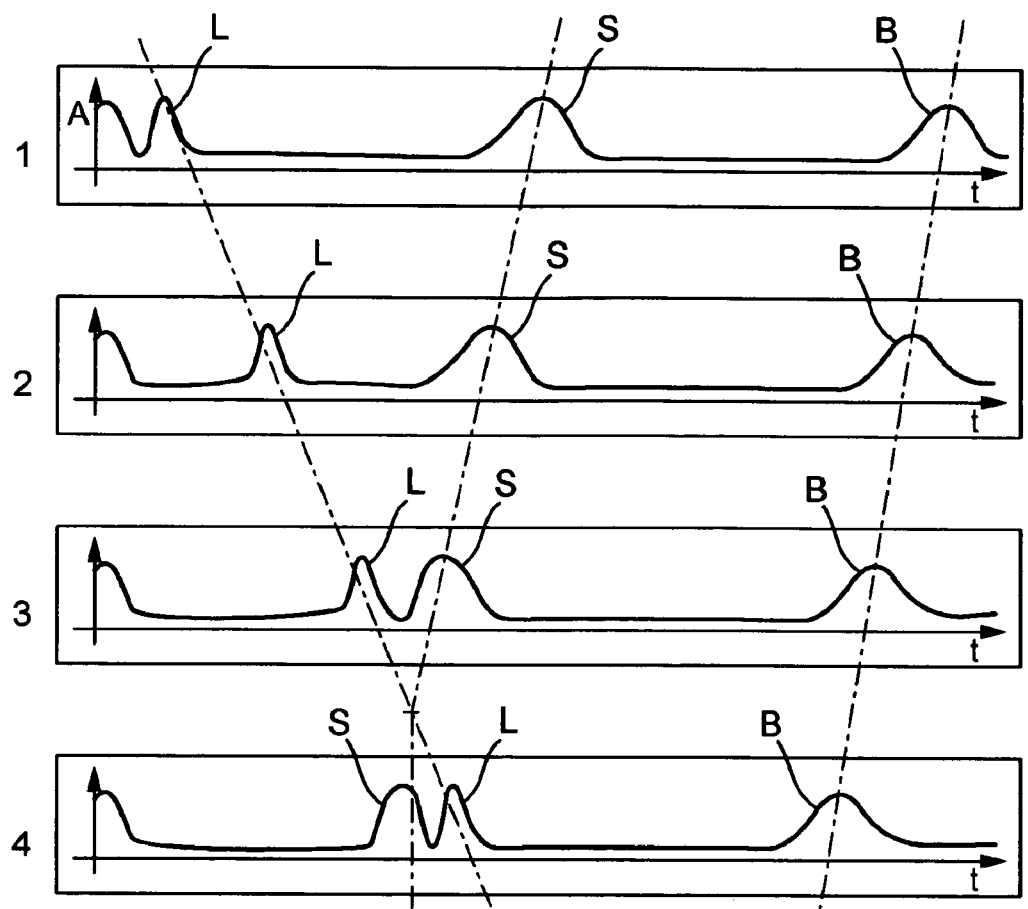
FIG. 3 shows the columns of the table, wherein, for purposes of illustration, the echo function to be entered in a column is shown graphically associated with that column.
Figure 3:
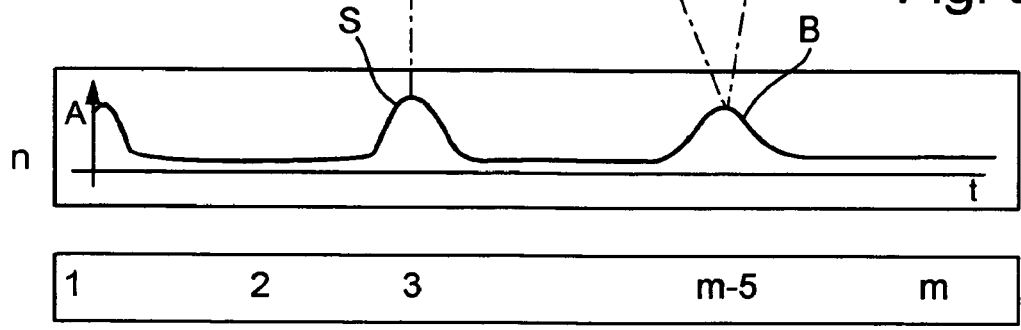

In FIG. 3, columns 1 to n contain echo functions in the sequence in which they are to be ordered in the table. In the table, each row of a column corresponds to a travel time.

For purposes of explanation, the right edge of FIG. 3 has been provided with an additional column, in which is entered a row index for each of the rows 1 to m. In the illustrated example, the row index increases with the travel time t. Alternatively, the row index could fall with the travel time. Equivalent to the travel time is a distance corresponding to the travel time, analogously to that explained above for the columns.

The first column 1 of the table contains an echo function for the full container 3. In FIG. 3, this echo function is drawn in column 1 as the curve for the function. In the table as it is actually used in practice, of course, there is no curve, but, instead, an amplitude value is stored in some, or all, of rows 1 to m of the first column 1, depending on what the amplitude is for each of the travel times corresponding to the individual row indices 1 to m. The same is done analogously in the case of the remaining columns 2 to n of the table.

The echo function of column 1 begins with a decay of the transmitted signal S. This is immediately followed by the echo L reflected at the fill substance surface. About in the middle of the column, the echo S of the disturbance 9 shows up, and, in the last rows m, m−1 . . . ) the echo B from the floor 15 is found.

The last column n of the table contains an echo function for the empty container 3. In FIG. 3, this echo function is drawn in column n as the curve for the function. The echo function begins with the decay of the transmitted signal S. This is followed about in the middle of the column by the echo S from the disturbance 9, this being followed at some distance by the echo B from the floor 15. There is no echo L from a fill substance surface in the case of this echo function, since the container 3 is empty.

If one compares the travel times $t_S$ and $t_B$ of the echoes S and B of the disturbance 9 and the floor 15, it is apparent that the two echoes S and B in column n occur at shorter travel times $t_S$, $t_B$ than in column 1. The reason for this is that the transmitted signals S and their echo signals E must travel long distances through the fill substance 1 in the case of a full container 3, while they propagate through free space in an empty container 3. The difference in travel time results from the fact that the propagation velocity of microwaves is less in the fill substance 1 than in free space.

Besides the two outer columns 1 and n, FIG. 3 shows three other columns a, c and f.

Column a corresponds to a fill level, which lies between the maximum fill level for the full container 3 and that of the disturbance 9. Column c corresponds to a fill level, in which the disturbance 9 is still just covered by the fill substance 1, and the column f to a fill level, in which the disturbance 9 is no longer covered by fill substance.

On the basis of FIG. 3, some basic patterns can be recognized.

Echo B from the floor exhibits in column 1 its greatest travel time $t_B$ and in column n its smallest travel time $t_B$. Moving from column 1 to column n, the travel time $t_B$ of this echo B decreases continuously.

Echo L from the fill substance surface exhibits in column 1 its smallest travel time $t_L$, and in column n its greatest travel time $t_L$. Moving from column 1 to column n, the travel time $t_L$ of echo L increases continuously.

The echo S from disturbance 9 exhibits in column 1 its greatest travel time. Subsequently, the travel time $t_S$ decreases continuously with falling fill level, until the fill level arrives at the same level as the disturbance 9. Falling fill level is synonymous with increasing column index. Once the fill level has fallen beneath the level of the disturbance 9, then the travel time $t_S$ of the echo S from the disturbance 9 no longer changes with falling fill level, or increasing column index. The travel time $t_S$ of the echo S in column f is equal to that in column n. In column 1, it is greater than in column a, in column a grater than in column c, and in column c greater than in column f.

Of course, all information contained in an echo signal does not have to be reproduced in the table. Instead, the echo functions stored in the table can be greatly simplified images of the echo signals. For instance, the data can be extensively compressed and, to the extent possible, keep only essential information. It is also conceivable that the table only store echo functions containing only the amplitudes and the travel times of the maxima of the echoes occurring in an echo signal. One can even use echo functions that only contain the travel times of the maxima. The table contains in this case very many free fields and, consequently, requires correspondingly less space in memory. Equally, not every little echo needs to be recorded. For example, threshold values for a minimum acceptable amplitude can be established, which an echo must at least exhibit, before it is permitted in the table.

The data of the table are produced and stored, on site, by and with the described arrangement. For this purpose, various methods can be used.

One possible method for generating the table includes inputting the actual fill level once, at the beginning. This can e.g. be determined e.g. by an auxiliary measurement, using another measuring device, or by establishing an obviously identifiable fill level, such as the full level, or the empty level.

On the basis of this predetermined, known fill level, an echo reflected from a fill substance surface is identified in an echo signal or the associated echo function.

This echo, recognized once as a fill level echo, is then followed over a period of time. If the fill level changes, the fill level echo is manifest on the basis of the following of the echo. The fill level, in turn, comes from the travel time of the fill level echo.

During this period of time, transmitted signals S are issued periodically. The echo signals E of the transmitted signals S are sensed and echo functions are formed from the echo signals E.

The echo function determined at a point in this period of time is stored in a column whose column index corresponds to the fill level for that time, as determined by the following of the fill level echo.

There are, however, a number of applications where it is not possible, or else very expensive, to supply, in advance, an actual fill level. In these cases, a method is preferred where it is possible to complete the table without the initial input of an actual fill level.

The following is such a method. Initially, a transmitted signal S is issued and its echo signal E sensed. From the echo signal E, an echo function is derived, and a useful echo is designated as probably coming from a reflection at the surface of the fill substance. In this connection, the designation of the useful echo can be performed exactly as such is done in the case of conventional fill level measuring devices. For instance, as explained earlier, the maximum with the greatest amplitude can be chosen. Also possible, however, is choice of the useful echo on the basis of a shape of the echo and/or on the basis of travel time guidelines and/or amplitude guidelines.

The useful echo, once chosen, is then followed over a period of time. Exactly as in the case of the aforementioned method, transmitted signals S are periodically issued during this period of time, their echo signals E sensed, and, from the echo signals E, echo functions are determined.

The echo functions are stored in the table, each in a column under a column index that corresponds to a fill level determined for this point in time by the following of the useful echo.

Preferably, a plausibility review of the table is subsequently performed. The result of the plausibility review is that the useful echo is confirmed, or refuted, as being an echo reflected from the fill substance surface.

An especially good form of the plausibility review is based on finding in the table contour lines, which indicate changing travel time of the useful echo as a function of the column index standing, here, for the fill level. To do this, for example, the maxima of the echo functions are determined in all columns, and, beginning, for example, with column 1 as the starting column, it is checked whether the neighboring column likewise has maxima lying in the immediate vicinity of the maxima in the starting column. If this is the case, the neighboring maxima are connected by a contour line segment. In this manner, all columns are gone through, and the neighboring contour line segments join together to form contour lines.

On the basis of the contour lines, it can be recognized whether the chosen useful echo is really the correct useful echo, thus whether it comes from reflections from the fill substance surface.

For better understanding, characteristics of the contour lines will now be discussed, characteristics indicating that the useful echo really is the correct useful echo, and characteristics indicating the opposite.

In the table illustrated in FIG. 3, the correct echo was used in all columns, i.e. that echo which was, in fact, reflected at the fill substance surface. FIG. 3 shows the contour lines obtained in the aforementioned manner. Three clear contour lines HL, HB, HS can be discerned. Contour line HL comes from the echo reflected at the fill substance surface and climbs strictly monotonically. The contour line HB comes from the floor and falls strictly monotonically. The contour line HS comes from reflections from the disturbance 9 and intersects the contour line HL.

Figure 4:
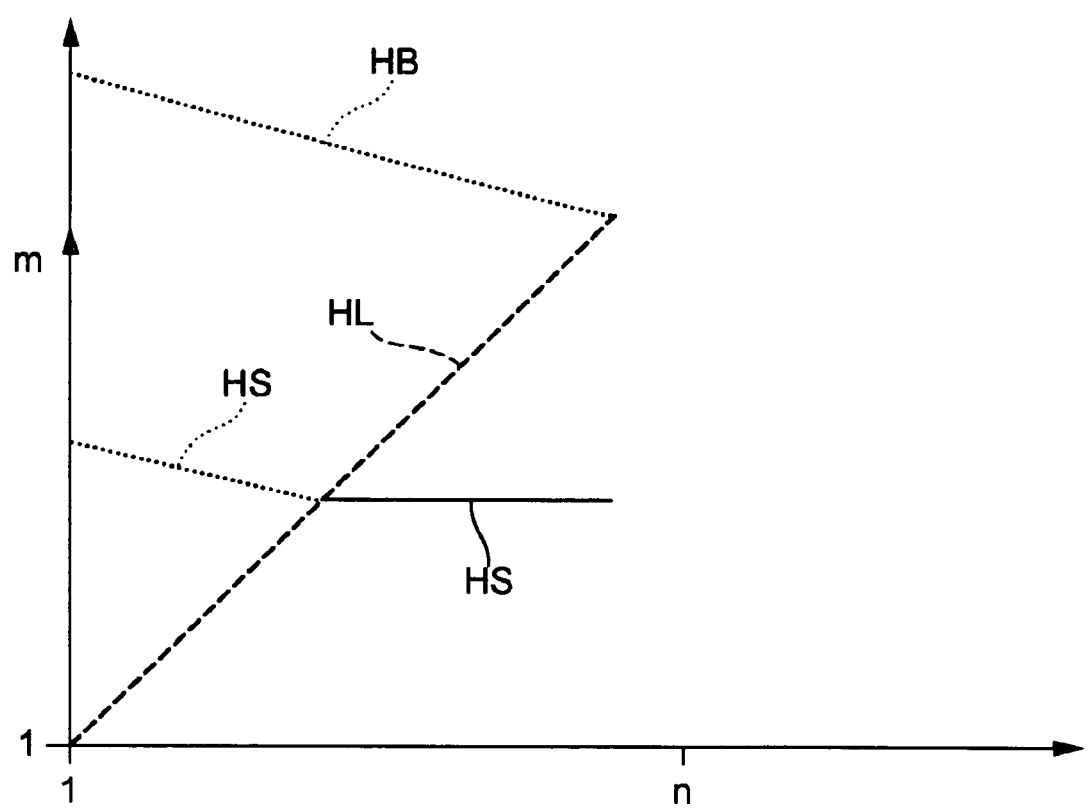
FIG. 4 shows a diagram in which the contour lines of the table are presented for the case in which the echo actually reflected at the fill substance surface was employed as the useful echo.

FIG. 4 shows these contour lines in a two-dimensional diagram.

Figure 5:
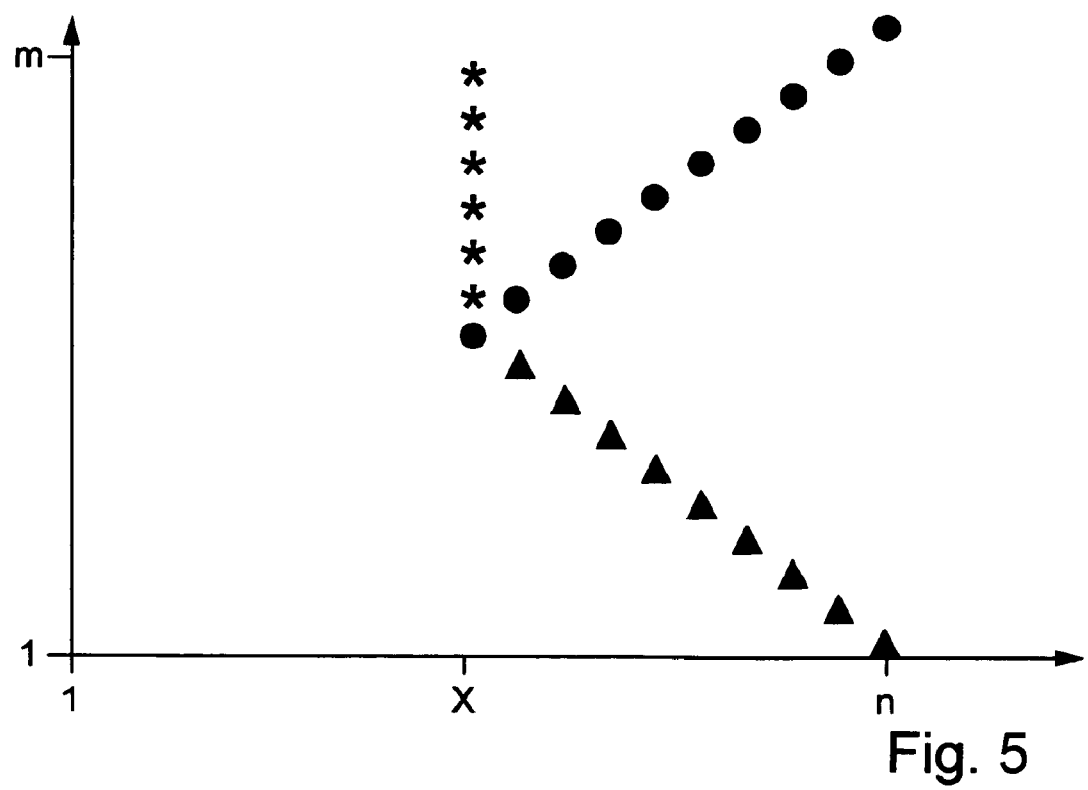
FIG. 5 shows a diagram in which the contour lines of the table are presented for the case in which the echo reflected at the disturbance was employed as the useful echo.

If an echo is chosen as useful echo, and it, in fact, is not caused by a reflection at the fill substance surface, but, instead, comes from the disturbance 9, then a very different picture is obtained. FIG. 5 is an example of the contour lines which occur in such a case.

To illustrate, one can imagine the empty container 3, which is filling slowly. For the empty container 3, the useful echo and the echo B of the floor 15 are logged. Since the useful echo is interpreted as the fill level echo, the associated echo function is entered in the table in the column X corresponding to the travel time tx of the useful echo in the case of empty container.

If the fill level increases slowly, there appears in the echo functions, in addition to the useful echo, a fill level echo, which approaches the useful echo with increasing fill level. These fill level echoes move in the table in column X in the vertical direction toward the useful echo. This is indicated in FIG. 5 by the points in the shape of stars.

If the fill level increases further and surpasses the level of the disturbance, then the travel time of the useful echo starts increasing. The longer travel time results due to the lower propagation velocity of the transmitted and received signals S, E in the fill substance. Since the useful echo is interpreted as an echo reflected from the fill substance, although actually it is the echo of the disturbance 9, the corresponding echo functions are entered in the table in accordance with the travel times of the useful echo. As a result, the useful echo now moves in FIG. 5 upwardly along the diagonal. This is shown as the dotted line.

At the same time, of course, the travel time of the echo reflected from the fill substance continues to decrease. This echo moves correspondingly in FIG. 5 to the right and downwards. The greater the travel time of the useful echo, the smaller is that of the echo reflected from the fill substance. This is illustrated by the triangles.

From these considerations, the generalization can be derived that always then, when a contour line section emerges from the table, in which the travel times are falling with increasing fill level, although the echo source associated with the contour line section is supposedly not covered by the fill substance, then the useful echo is not attributable to a reflection from the fill substance.

The echo source is not covered by fill substance, when the travel times of the contour line section are smaller in one column then the travel time of the useful echo in the same column. That is, the contour line section in the diagram illustrated in FIG. 5 lies beneath the diagonal.

In the selected presentation, in which column-index and row-index both increase with increasing travel time, an occurrence of contour line sections with negative slope beneath the diagonal means that the useful echo was chosen incorrectly.

Consequently, in the plausibility review, the contour lines are preferably first determined. Then, it is checked whether a contour line section is present, in which the travel times are falling with increasing fill level and in which the travel times in one column are less than the travel time of the useful echo in the same column.

When such a contour line section is not present, then the useful echo is accepted as an echo reflected from the fill substance surface.

However, when the plausibility review yields that the useful echo does not come from a reflection at the fill substance surface, then the instantaneous fill level is found, preferably by means of the table. Subsequently, the whole process is repeated, with the echo corresponding to the instantaneous fill level determined by means of the table being chosen as the useful echo.

In determining the instantaneous fill level on the basis of the table, the recognition is used, that the contour line, which falls with increasing travel time and which, at the same time, exhibits shorter travel times in one and the same column than the useful echo, is to be attributed to echoes which are being reflected from the fill substance surface.

The current fill level thus can be determined from the table by issuing a transmitted signal S, whose echo signal E is logged, deriving from the latter the associated echo function, and comparing this with the echo functions of the table. From the comparison, it is determined which echo function comes closest to the currently logged echo function. If the determined echo function lies in a column, in which there is also a segment of the falling contour line section, then the travel time of the segment leads immediately to the current fill level. In the example presented in FIG. 5, this would be the case, when the column index of the determined column is greater than X.

If the column index is equal to X, then there are two possibilities. If, from the echoes of the current echo function, with exclusion of the useful echo, a fill level echo can be unequivocally identified, then one has therefrom the current fill level. If this is not the case, further transmitted signals S can be issued, their echo signals E sensed and their associated echo functions compared with those of the table, until the comparison of the current echo function with the echo functions of the table yields an echo function whose column index is greater than X. This means for the operator that he or she must wait until the fill level exceeds the level of the disturbance which was causing the previous useful echo.

Alternatively, of course, a new echo of the current echo function, which, naturally, is not equal to the previous useful echo, can be chosen as a probable useful echo. The whole process is then repeated with this new probable useful echo.

Besides the aforementioned method for storing container-specific data in the table, other methods can be used.

One advantageous method resides in issuing a transmitted signal S, whose echo signal is sensed, and from the echo signal a plurality of echoes are chosen. In the clear echo signal E of FIG. 2, for example, the echoes L, S and B would be chosen.

All chosen echoes, here L, S and B, are followed over a period of time and one of these echoes is determined to be probably coming from a reflection at the surface of the fill substance.

In order to facilitate understanding, reference is made here back to the example illustrated in FIGS. 2 and 3. For explaining the principle, a case is considered, for purposes of simplicity, in which the initially full container 3 completely empties over the period of time.

During this period of time, in which the echoes are followed, transmitted signals S are periodically issued and their echo signals E sensed. For every echo signal, the travel times of the chosen echoes are determined.

Figures 6, 7:
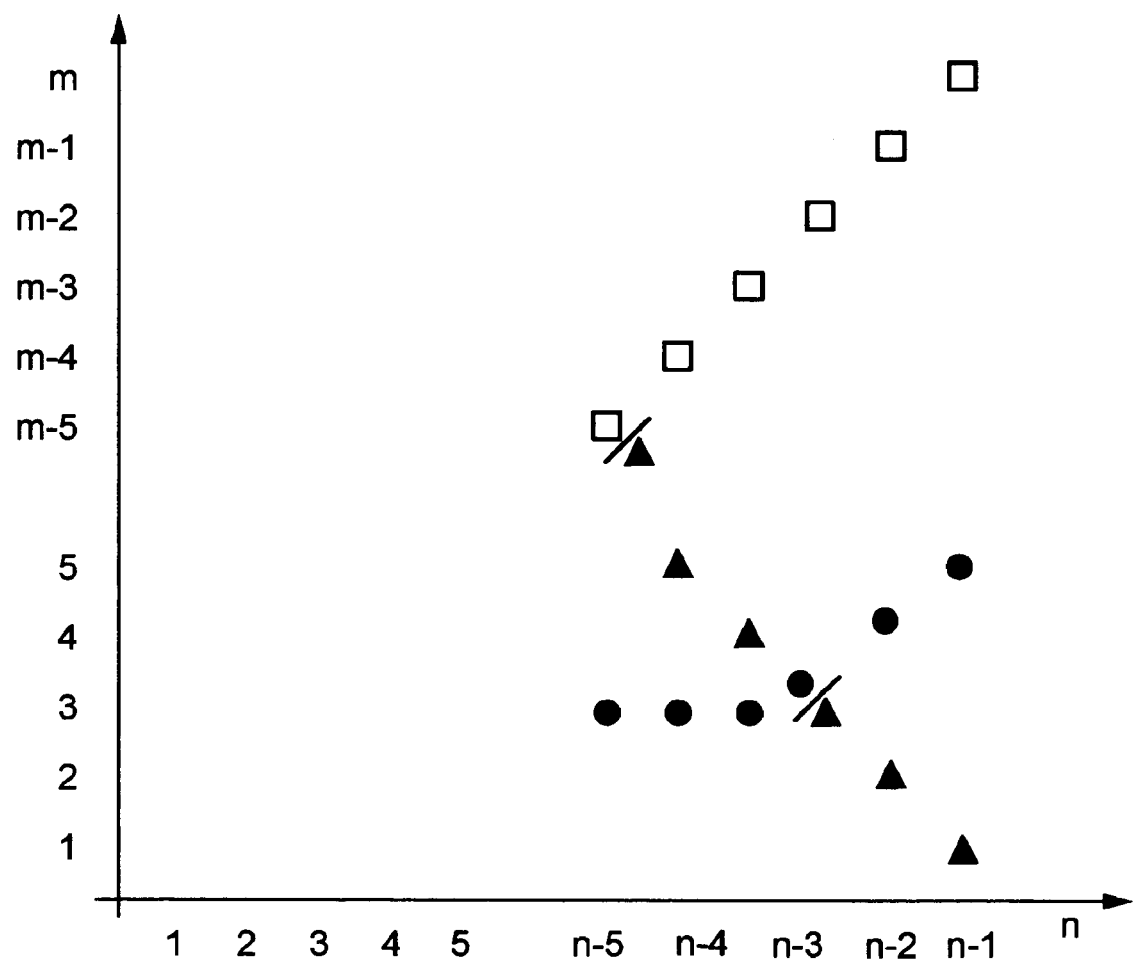
FIG. 6 shows a overview for the followed echoes of the fill substance surface, the disturbance and the floor.
FIG. 7 shows a diagram in which the contour lines of the table are presented for the case in which the echo reflected at the floor was employed as the useful echo.

The recording of the table is begun with full container 3 at time $t_0$, and, over the period of time, at times $t_0$ to $t_5$, Echo signals E are logged. Of course, as a rule, very many more, e.g. several hundred, echo signals E will be evaluated. The limiting here to $t_0$ to $t_5$ is only for the purpose of an improved overview. For each of the points in time $t_0$ to $t_5$, the positions of the chosen echoes L, S, B are determined. FIG. 6 provides an overview, in which the positions of the echoes L, S, B are entered for the times $t_0$ to $t_5$. The positions of the echoes L, S, B are determined by their travel times, which, in turn, correspond to distances from the antenna 11 and can be directly associated with a row index. Correspondingly, the row indices have been used in FIG. 6.

If, now, one of the echoes L, S, B is identified as useful echo coming from the fill substance surface, then the table can be directly produced from the overview.

In doing this, the probable fill level to be associated with the useful echo for each echo signal E is determined.

This corresponds in our example to the row index entered in the first row of the overview under L.

Subsequently, the column corresponding to this probable fill level is determined. The column index of this column is equal to the row index entered under L.

Then, in this column a value is stored for each of the chosen echoes L, S, B in a row corresponding to the travel time of the particular echo L, S, B. The row index of each of these rows is equal to the row index entered in the overview at the corresponding location. The value to be entered is, in the simplest case, a constant, which merely indicates that, at the corresponding location, a maximum is present. Instead of this, however, the actual amplitudes of the echoes L, S, B can also be entered. All other fields of the table empty. This offers the advantage that the table exhibits only a very small requirement for memory space.

Starting from the overview of FIG. 6, a table corresponding to FIG. 4 is obtained, if one correctly recognizes the echo L as the useful echo.

If, by mistake, echo S is considered to be the useful echo, then a table as illustrated in FIG. 5 is obtained. If, by mistake, echo B is considered to be the useful echo, then a table as illustrated in FIG. 7 is obtained.

Same as in the case of the method described above, here also plausibility reviews are preferably performed, the results of which confirm, or refute, the useful echo as an echo reflected at the fill substance surface. The plausibility review can be conducted exactly as done for the previously described method. As is evident from the FIGS. 4, 5 and 7, an investigation of the contour line sections shows that only in the case of FIG. 4 was the correct useful echo chosen. In FIGS. 5 and 7, in contrast, in each case there is a contour line segment, where the travel times fall with increasing fill level and where the travel times in one column are less than the travel time of the useful echo in the same column. This indicates immediately that in these two cases a wrong echo was selected as the useful echo. Exactly as in the case of the previously described method, the correct useful echo can be determined by means of a table created on the basis an incorrect useful echo.

The last described method offers, as well, the advantage that it does not have to be completely repeated. It is sufficient to use the overview of FIG. 6, now knowing the correct useful echo, as determined subsequently from the table, to make a new table.

An additional advantage of the last described method is that the contour line segments are recognizable in the table in very simple manner and, especially, without the need of costly algorithms.

Moreover, data missing in the table can be determined by extrapolation and stored in the table.

The last described method can, of course, also be applied in modified and/or simplified form.

An example of such a variant method includes e.g. issuing a transmitted signal S, sensing its echo signal, choosing a plurality of echoes from the echo signal, and following these chosen echoes over a period of time. Exactly as in the previously described method, one of these echoes is designated as probably coming from a reflection at the fill substance surface. Likewise during the period of time, transmitted signals S are issued and their echo signals sensed. For every echo signal E, the travel times of the chosen echoes are determined, as is the probable fill level to be associated with the useful echo.

Subsequently in this method, the column corresponding to this probable fill level is determined, and in this column a value is stored for each of the chosen echoes in rows appropriate for the particular echoes. The table won in this way corresponds essentially to the overview of FIG. 6. There, each echo L, S, B has its own row, and in the rows the travel times of the echoes L, S, B are stored. Since a steadily emptying container 3 formed the basis for the production of the overview of FIG. 6, the columns of the overview are already arranged in the correct sequence. If this were not the case, then one obtains the desired sequence by sorting the columns according to the travel times entered in the row of the useful echo.

The table won in this way contains, apart from the here irrelevant ordering according to the times at which the echo signals E were logged, all the information which was present in the previously described method. Correspondingly, just as in the previously described method, the table can undergo a plausibility review, the result of which confirms, or refutes, the useful echo as an echo reflected at the fill substance surface.

Likewise in the case of this method, missing data can be determined by extrapolation.

Once the table has been created and stored, reliable fill level measurements can be performed with the fill level measuring device at any time, thus even after extended pauses in measurement activity, immediately after switching the fill level measuring device on, by the device on its own and especially without having to first input the current fill level or execute some other initialization procedure.

To this end, the fill level measuring device 5 includes an evaluation unit 19, which accesses a table stored in the memory 17 for determining fill level.

In the fill level measurement, a transmitted signal S is issued, its echo signal E sensed, and from the echo signal E a current echo function derived.

For determining the fill level, a comparison of the current echo function with the echo functions stored in the table is performed, and from this comparison the current fill level is derived.

This happens preferably by determining in the comparison which of the echo functions stored in the table has the greatest agreement with the current echo function. The current fill level is then equal to the fill level associated with the column index of the matched echo function.

At an initial start-up, a fill level measuring device 5 of the invention works in the same way accurately and reliably as conventional fill level measuring devices. It is, however, different from conventional fill level measuring devices, in that it has the ability to learn on its own. By setting up the table, the fill level measuring device puts itself in the position of being able to recognize errors in measurement, without external help and without additional costs and/or expenditure of time.

Also, no new initialization procedure is required after an extended pause in, or a complete interruption of, measurements. The fill level measuring device 5 works following a re-start immediately with a very high reliability, because of the data in the table. It can, even in difficult cases, utilize the method of the invention to recognize unequivocally the particular echo that is caused by a reflection at the fill substance surface.

The invention claimed is:

1. A fill level measuring device for measuring a fill level of a substance in a container, comprising:
   at least one antenna for issuing transmitted signals (S) and for receiving echo signals (E);
   a signal processor, which serves for deriving from the received echo signals (E) an echo function, which contains amplitudes (A) of the echo signals (E) as a function of their travel time;
   a memory for storing container-specific data in a table, whose columns serve for recording in each case one echo function, wherein the echo functions are stored in the columns in a sequence corresponding to the fill levels of the respective echo functions; and
   an evaluation unit, which has access to the table for determining the fill level.

2. A fill level measuring device as claimed in claim 1, wherein:
   the data are stored in said memory in compressed form.

3. A method for the storing of container-specific data in the table of a fill level measuring device, comprising the steps of:
   identifying an echo reflected from a fill substance surface as a fill level echo on the basis of a previously input fill level;
   following the identified echo over a period of time; and
   issuing periodically, during this period of time, transmitted signals (S) sensing their echo signals (E) and, from the echo signals, forming echo functions, each of which is stored in the table in a column having a columns index corresponding to a fill level determined at a particular point in time by the following of the fill level echo.

4. The method for the storing of container-specific data in the table of a fill level measuring device as claimed in claim 3, wherein:
   the plausibility review includes recognizing in the table contour lines, which indicate a change of a travel time of particular echoes as a function of the fill level;
   it is checked whether a contour line section is present, in which the travel times fall with increasing fill level and in which the travel times in one column are less than the travel time of the useful echo in the same column;

the useful echo is refuted as an echo reflected at the fill substance surface, if such a contour line section is present; and the useful echo is accepted as an echo reflected at the fill substance surface, if such a contour line section is not present.

5. The method for storing of container-specific data in the table of a fill level measuring device as claimed in claim 4, wherein:

the instantaneous fill level is found by means of the table, when the plausibility review shows that the useful echo does not come from a reflection at the fill substance surface, and the entire method is repeated; and for the useful echo, that echo is chosen, which corresponds to the instantaneous fill level determined by means of the table.

6. The method as claimed in claim 3, wherein:

data missing in the table are determined by extrapolation and stored in the table.

7. The method for the storing of container-specific data in the table of a fill level measuring device comprising the steps of:

issuing a transmitted signal (S), sensing its echo signal (E), and deriving an echo function from the echo signal (E);

designating a useful echo as probably coming from a reflection at the fill substance surface, this useful echo is followed over a period of time;

issuing during this period of time, transmitted signals (S), whose echo signals (E) are sensed, and, from the echo signals, determining echo functions, each of which is stored in the table in a column under a columns index corresponding to a fill level determined at a particular point in time by the following of the fill level echo.

8. The method as claimed in claim 7, further comprising the steps of:

performing a plausibility review of the table, the result of which either confirms, or refutes, the useful echo to be an echo reflected from the surface of the fill substance.

9. The method for the storing of container-specific data in the table of a fill level measuring device as claimed in claim 8, wherein:

the instantaneous fill level is found by means of the table, when the plausibility review yields that the useful echo does not come from a reflection at the surface of the fill substance, and the entire method is repeated; and as useful echo, that echo is chosen, which corresponds to the instantaneous fill level determined by means of the table.

10. The method for the storing of container-specific data in the table of a fill level measuring device as claimed in claim 9, wherein:

the instantaneous fill level is found by means of the table, when the plausibility review shows that the useful echo does not come from a reflection at the fill substance surface, and the entire method is repeated; and for the useful echo, that echo is chosen, which corresponds to the instantaneous fill level determined by means of the table.

11. A method for the storing of container-specific data in the table of a fill level measuring device comprising the steps of:

issuing a transmitted signal (S), and sensing its echo signal (E);

choosing from the echo signal, a plurality of echoes;

designating one of such echoes as a useful echo probably coming from a reflection at the fill substance surface;

periodically issuing during the period of time, transmitted signals (S), whose echo signals (E) are sensed, for each echo signal (E), the travel times of the chosen echoes are determined, and for each echo signal (E), the probable fill level to be associated with the useful echo is determined;

determining the column corresponding to this probable fill level; and storing values in this column for each of the chosen echoes in rows corresponding to the travel times of the chosen echoes.

12. The method as claimed in claim 11, further comprising the steps of:

conducting a plausibility review of the table, the result of which either confirms or refutes the useful echo as an echo reflected from the fill substance surface.

13. The method for the storing of container-specific data in the table of a fill level comprising: at least one antenna for issuing transmittal signals (S) and for receiving echo signals (E); a signal processor, which serves for deriving from the received echo signals (E) an echo function, which contains amplitudes (A) of the echo signals (E) as a function of their travel time; a memory for storing container-specific data in a table, whose columns serve for recording in each case one echo function, wherein the echo functions are stored in the columns in a sequence corresponding to the fill levels of the respective echo functions; and an evaluation unit, which has access to the table for determining the fill level comprising the steps of:

issuing a transmitted signal (S) whose echo signal (E) is sensed;

deriving a current echo function from the echo signal (E); and performing a comparison of the echo function with the echo functions stored in the table.

14. The method for the storing of a container-specific data in the table of a fill level measuring device as claimed in claim 13, wherein:

the comparison leads to an echo function in the table having the greatest agreement with the current echo function, and the fill level is set equal to the fill level associated with the column index of such echo function in the table.

* * * * *